United States Patent [19]

Kress et al.

[11] 4,063,658
[45] Dec. 20, 1977

[54] SLAG POT CARRIER

[76] Inventors: Edward S. Kress, 4009 Brookdale Place, Peoria, Ill. 61614; Jackson C. Medley, P.O. Box 322, Brimfield, Ill. 61517; Merrill E. Pinter, 315 Dwight St., Kewanee, Ill. 61443

[21] Appl. No.: 712,485

[22] Filed: Aug. 9, 1976

[51] Int. Cl.² .............................................. B65G 65/04
[52] U.S. Cl. ...................................... 214/314; 214/317
[58] Field of Search ............... 214/312, 313, 314, 315, 214/317, 776, 502, 390; 298/11

[56] References Cited

U.S. PATENT DOCUMENTS

| 2,313,514 | 3/1943 | Brooks | 214/317 |
| 3,181,430 | 5/1965 | Freedy et al. | 214/776 |
| 3,335,885 | 8/1967 | Livingston | 214/314 |
| 3,360,146 | 12/1967 | Borer et al. | 214/776 |
| 3,834,568 | 9/1974 | Larson et al. | 214/77 R |
| 3,918,601 | 11/1975 | Zimmerman | 214/140 |

FOREIGN PATENT DOCUMENTS

| 1,400,373 | 7/1975 | United Kingdom | 214/313 |
| 1,426,863 | 3/1976 | United Kingdom | 214/317 |

Primary Examiner—Lawrence J. Oresky
Attorney, Agent, or Firm—Leydig, Voit, Osann, Mayer & Holt, Ltd.

[57] ABSTRACT

A carrier having a wheeled, open-ended, frame pivotally the frame and cradle can be maneuvered around a pot and under projections on the pot. A pair of primary linear actuators on the frame are coupled through levers and links so as to cause the cradle to lift the pot for transport and thereafter dump the pot by tilting the cradle more than 140° while maintaining good mechanical advantage. Secondary cylinders are positioned to bear traveling loads, eliminating the pressure in the primary cylinders and the forces through the links and pins. The levers and links are designed so as to avoid twisting and binding under heavy loads.

4 Claims, 7 Drawing Figures

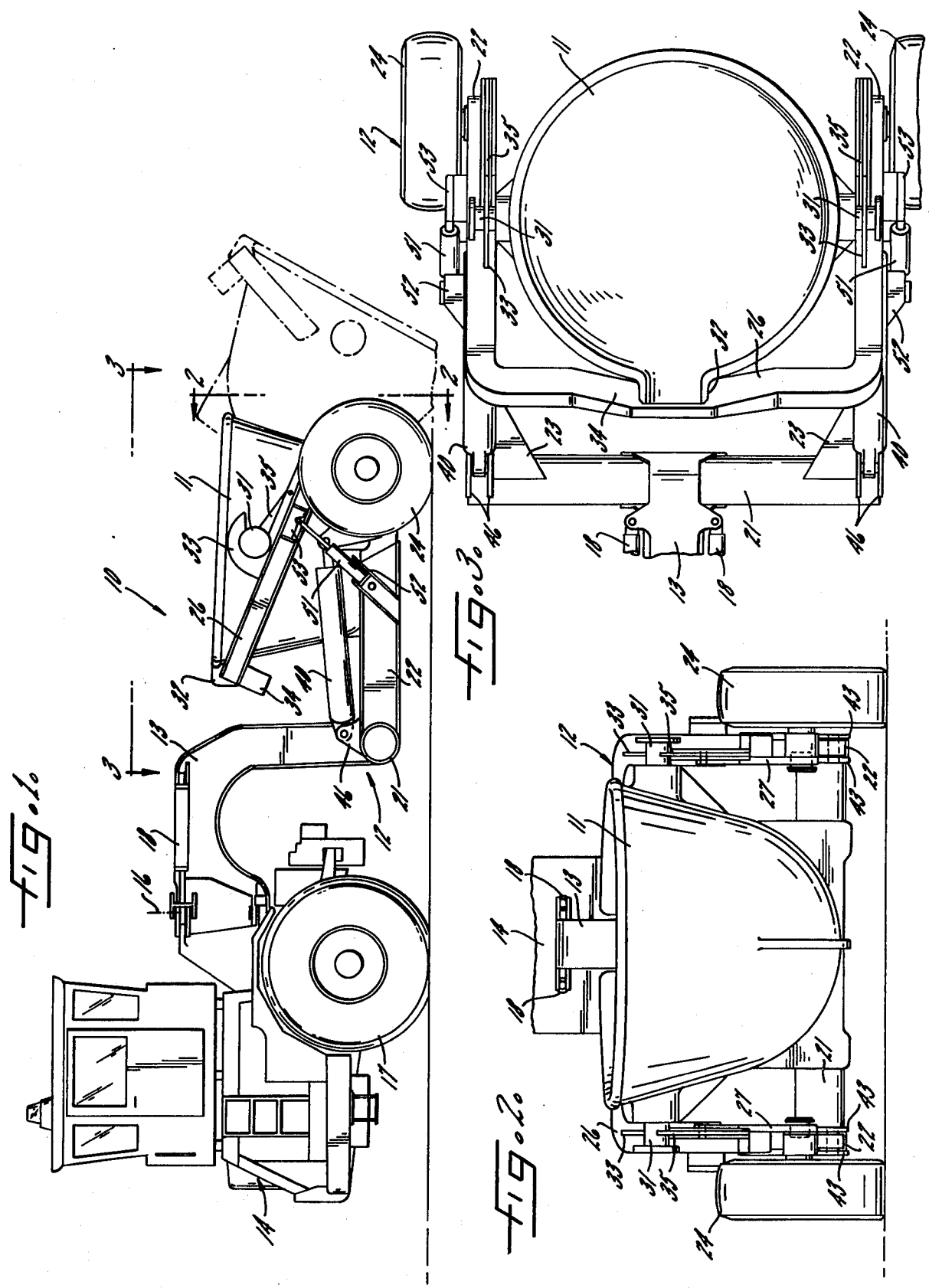

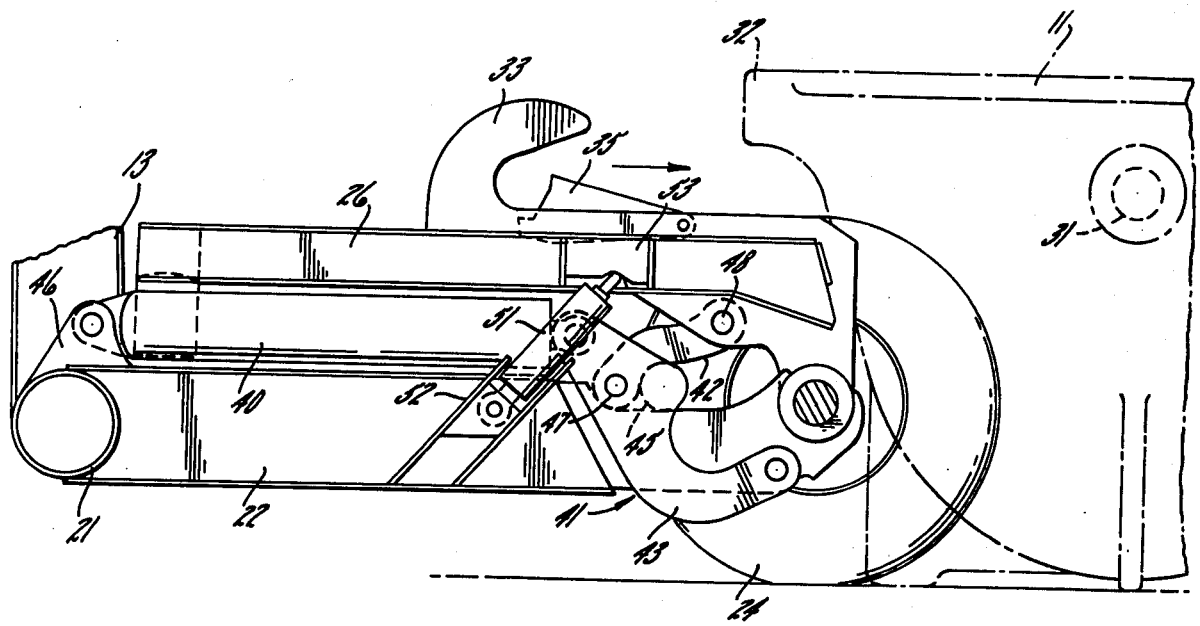
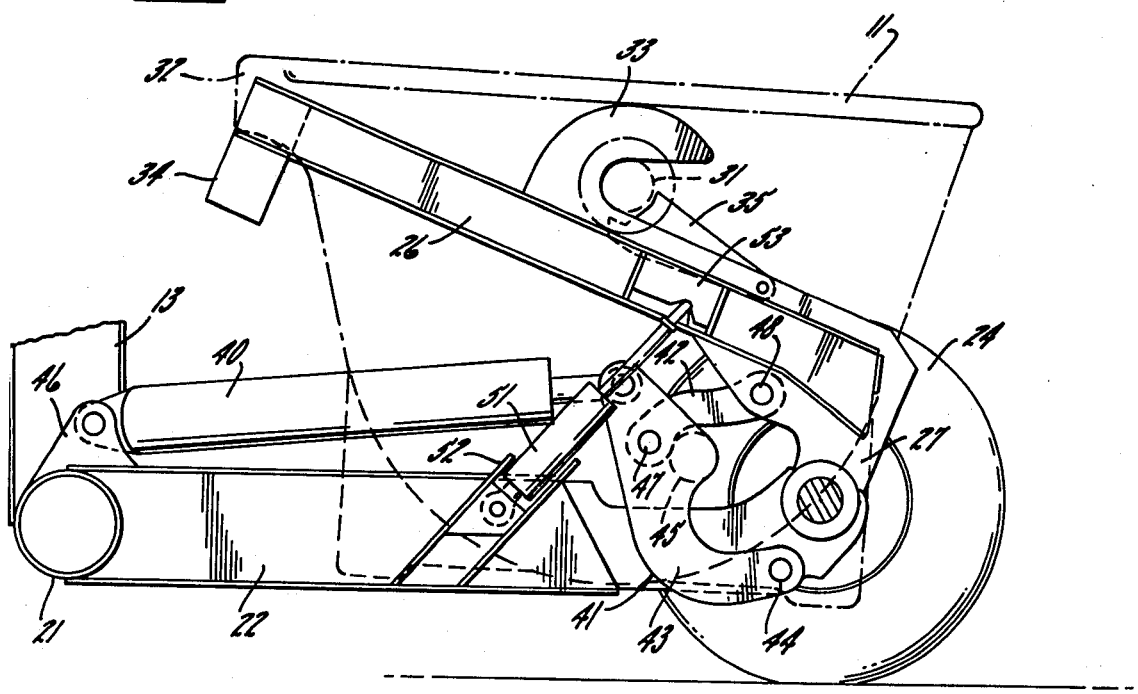

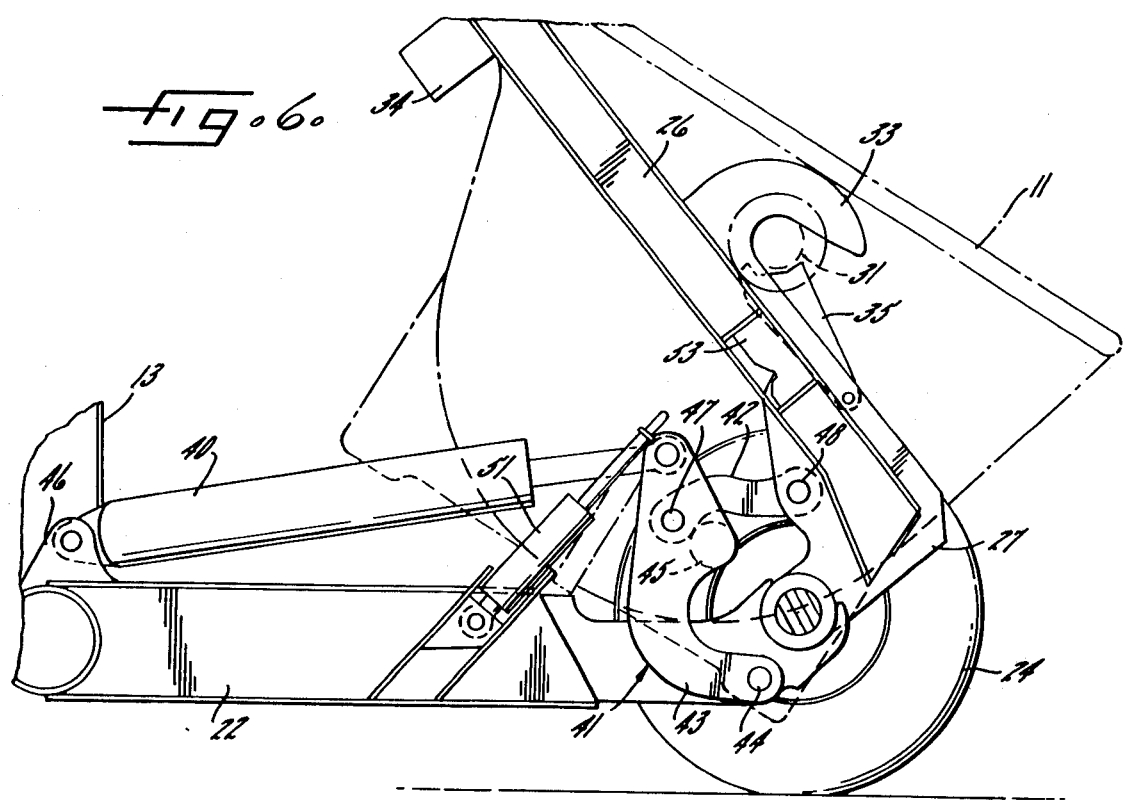
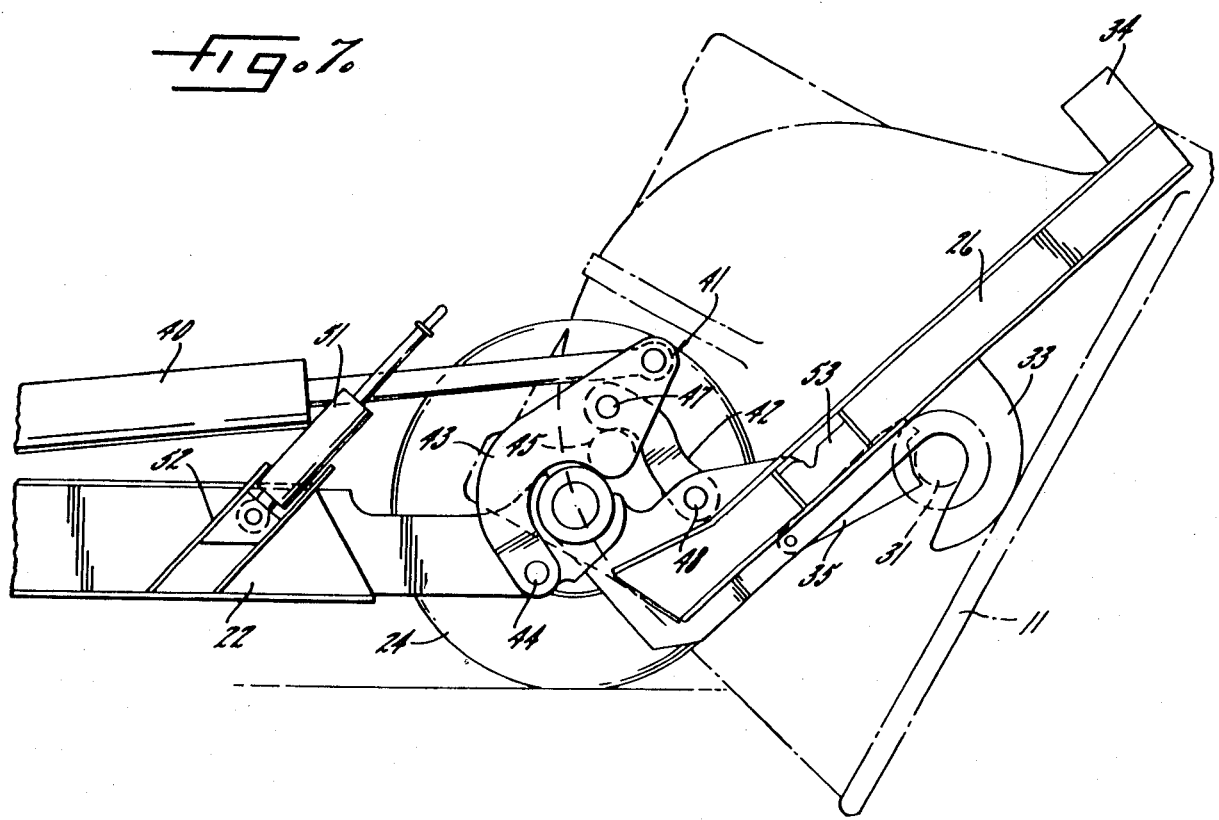

SLAG POT CARRIER

This invention relates generally to carrying and dumping vehicles and more particularly concerns a carrier for handling bulk material containers and slag pots.

In U.S. Pat. No. 3,330,429, issued July 11, 1967, there is disclosed and claimed a slag pot handling carrier intended to pick up, transport and dump large ladles or "pots" of the kind used in slag generating industries and which weigh, when loaded, on the order of 35 to 200 tons. Keeping in mind that overall width must be kept to a minimum, this approach to the handling of such pots has proven attractive, and it is believed could be successfully applied to the handling of smaller loads by using a carrier scaled, in size, cost and complexity, to a smaller sized pot.

It is therefore the primary aim of this invention to provide a slag pot carrier of relatively simple design that will lift, transport and dump small load slag pots or similarly shaped boxes weighing, when loaded, 35 tons or less. However, this system can also be adapted and scaled to handle the larger pots with equal efficiency.

In more detail, it is an object of the invention to provide a carrier of the above type that utilizes only two major primary working linear hydraulic actuators and two small simple secondary holding cylinders. Another object is to provide a carrier as characterized above that is compact, lightweight in relation to its pay load, and easy to control.

Other objects and advantages of the invention will become apparent upon reading the following detailed description and upon reference to the drawings, in which:

FIG. 1 is a side elevation of a carrier embodying the present invention;

FIG. 2 is a slightly enlarged and fragmentary rear elevation of the carrier shown in FIG. 1;

FIG. 3 is a fragmentary plan taken approximately along the line 3—3 in FIG. 1; and FIGS. 4, 5, 6 and 7 are enlarged, fragmentary side elevations showing alternate operating positions achieved by the carrier of FIG. 1.

While the invention will be described in connection with a preferred embodiment, it will be understood that we do not intend to limit the invention to that embodiment. On the contrary, we intend to cover all alternatives, modifications and equivalents as may be included within the spirit and scope of the invention as defined by the appended claims.

Turning first to FIG. 1, there is shown a carrier 10 for a slag pot 11 or the like comprising a trailer 12 with a gooseneck-like member 13 connected to a two-wheeled prime mover or tractor 14. The trailer 12 and tractor 14 are pivoted about a vertical axis 16 that passes close to the axis of tractor ground wheels 17, and a pair of steering actuators 18 interconnect the tractor 14 and the trailer 12 for pivoting the assembly about the vertical axis 16 to give an extremely good maneuverability. The member 13 provides sufficient clearance so that the tractor 14 can be positioned substantially at right angles to the trailer 12 so that the unit can turn within its own length.

The trailer 12 includes a wheeled open-ended frame sized to surround three sides of the pot 11 and formed of a transverse tubular member 21 and a pair of side beams 22 rigidly secured to the member 21 and stiffened by corner plates 23. A pair of ground engaging wheels 24 are journaled on the open ends of the frame beams 22 on coinciding axes. A three-sided cradle 26 is pivoted at its open ends on the open ends of the frame 21, 22, the cradle 26 being box-like in cross section for strength, and having end plates 27 defining the cradle pivot axes which, in the illustrated design, coincide with the axes of the ground wheels 24.

The pot 11 is formed with side projections 31 in the form of trunnions and an end projection 32. The cradle 26 can assume a first position in which it rests on the frame 21, 22 (see FIG. 4) so that the frame can be maneuvered about the pot 11 with the cradle 26 embracing the pot and underlying the projections 31, 32. The side projections 31 fit in hooks 33 fixed on the cradle 26, and the cradle is shaped with a depressed seat 34 to underlie and receive the pot projection 32. Pivoted lug stops 35 are provided to lock the side projections 31 in the hooks 33 and, if desired, a simple pneumatic actuator (not shown) can be utilized to position the stops 35 between open and closed, i.e., locked, positions.

In accordance with the invention, a pair of linear actuators 40, acting through lifting levers 41, are operable for tilting the cradle 26 from its first, FIG. 4, position to a second position wherein the pot 11 is raised from the ground but held substantially level (see FIGS. 1 and 5), and then to a third position wherein the pot is at least partially inverted to a dumping position (see FIG. 7). Preferably, the lifting levers 41 are each formed of two plates 43 pivoted at 44 on opposite sides of the plate-like side beams 22 and rigidly joined by a cross member 45. The actuators 40 are pivotally anchored on lugs 46 formed on the frame 21, 22, and the outer ends of the rods of the actuators are pinned between the lever plates 43. The links 42 are likewise pivoted between the plates 43 at 47 and extend to pivot points 48 on the cradle plates 27.

The double plate form of the lifting levers 41, with the plates 43 embracing the frame beams 22, links 42 and the anchor points for the actuators 40, gives a non-binding rigidity to these parts, particularly important because of the high loads involved and the use of a single pushing actuator on each side of the cradle 26. The pivot points 47, 48 of the links 42 are located so that angular movement of the lifting levers 41 produces angular movement of greater magnitude of the cradle 26. In other words, the link pivots 47 are spaced further from the lever pivots 44 than the link pivots 48 are spaced from the cradle pivot axis. As a result, the lifting levers 41 are swung by the actuators 40 through less than 90° to produce tilting of the cradle 26 through approximately 140°. In this way, just two main actuators 40 can both lift the pot 11 to travel position as well as swing the cradle to its third dumping position.

To eliminate the load on the main actuator hydraulic system and its links during travel of the carrier 10 while carrying a loaded pot, as well as to assist the main linear actuator in picking the pot off the ground, a pair of struts in the form of simple two-position linear actuators 51 are mounted on the frame 21, 22 in box-like guides 52 and are adapted to be positioned for supporting the cradle 26 in its second, FIGS. 1 and 5, traveling position. When fully extended, the rod portion of the actuators 51 engage notched plates 53 fixed on the opposite sides of the cradle 26, and hence the extended actuators 51 prop the cradle in travel position independently of the main actuators 40.

Operation of the carrier 10 can now be readily appreciated. With the cradle 26 resting on the frame 21, 22 in its first, FIG. 4, position, the trailer 12 is maneuvered around the pot 11. The hooks 33 are positioned to directly engage the pot side projections 31 and the stops 35 lock the pot 11 on the carrier 26.

Slight extension of the actuators 40 tilts the cradle 26 to its travel, FIG. 5, position wherein the carrier seat 34 has engaged the pot projection 32 and the pot has been lifted well clear of the ground. Preferably, the pot 11 is held tilted slightly rearwardly (see FIG. 5) to reduce the swing of the pot during acceleration in transport and to encourage and spillage toward the rear so as to minimize the likelihood of spillage over the projection 32. When in travel position, the actuators 51 can be fully extended so as to prop the carrier in that angular position.

When the pot 11 has been transported to the desired dumping position, the actuators 40 are further extended swinging the cradle 26 through the positions of FIGS. 6 and 7. Retraction of the actuators 40 returns the pot to travel position and permits it to be again rested on the ground where desired.

Those skilled in the art will appreciate that the slag pot carrier 10 is of relatively simple design so as to be economical to manufacture and maintain, particularly in that only two primary linear actuators are utilized for lifting and dumping.

We claim as our invention:

1. A carrier for a pot having a pair of opposite side trunnions and an end projection comprising, in combination, a wheeled open-ended frame sized to surround three sides of said pot while the latter rests on the ground, a three-sided cradle pivoted at its open ends on the open ends of said frame, said cradle having a first position resting on and in horizontal contact with said frame wherein said frame can be maneuvered about said pot with the cradle embracing the pot and underlying said trunnions, a pair of lifting levers pivoted on said frame adjacent said cradle pivots, a pair of links one being pivoted between each lever and near each open end of said cradle, the pivot points of said links being located so that angular movement of said levers produces angular movement of greater magnitude of said cradle, and a pair of linear actuators mounted on said frame and connected to said levers for swinging said levers and thus tilting said cradle about its pivots from said first position through a second position, wherein the pot is raised from the ground but held substantially level, to a third position wherein the pot is tipped by abutting an abutment on the cradle and is at least partially inverted to a dumping position and in all three positions the cradle surrounds the pot and whereby the first, second and third positions lie consecutively along the arc produced by the swinging cradle.

2. The combination of claim 1 including a pair of positionable struts mounted on said frame and adapted to be positioned for underlying and supporting said said cradle in its second position and thereby removing the forces on said levers, links and actuators.

3. The combination of claim 2 in which said struts are linear actuators which, when fully extended, support said cradle so that the pot is slightly tilted to the rear to minimize spilling to the front and to reduce sway.

4. The combination of claim 1 in which said frame open ends are plate-like beams, each of said levers being formed of two plates mounted on opposite sides of said beams and rigidly joined by a cross member, and said actuators and said links being pivoted to said levers between the lever plates so that high forces are transmitted by said actuators through said links without twisting or binding of the parts.

* * * * *